April 25, 1961 J. J. EACHUS 2,981,471

INFORMATION MANIPULATING APPARATUS

Filed Dec. 9, 1957 3 Sheets-Sheet 1

INVENTOR.
JOSEPH J. EACHUS
BY Henry L. Hanson
ATTORNEY

INVENTOR.
JOSEPH J. EACHUS

BY Henry L. Hanson
ATTORNEY

April 25, 1961 J. J. EACHUS 2,981,471

INFORMATION MANIPULATING APPARATUS

Filed Dec. 9, 1957

3 Sheets-Sheet 3

INVENTOR.
JOSEPH J. EACHUS
BY Henry L. Hanson
ATTORNEY 2,981,471
Patented Apr. 25, 1961

2,981,471

INFORMATION MANIPULATING APPARATUS

Joseph J. Eachus, Cambridge, Mass., assignor to Minneapolis-Honeywell Regulator Company, Minneapolis, Minn., a corporation of Delaware Filed Dec. 9, 1957, Ser. No. 701,435
1 Claim. (Cl. 235—175)

A general object of the present invention is to provide a new and improved apparatus for manipulating digital data. More specifically, the present invention is concerned with a new and improved apparatus for manipulating data by electronic circuitry such that the data may be converted from one form of notation to another form of notation at electronic speeds and with a minimum of electronic equipment.

In certain types of electronic digital manipulating circuits, there is a need to provide for circuits having a very high degree of flexibility in the handling of the information in order to increase the usability of the apparatus. In some instances, the data required may be in one form such as the binary coded form, while in other instances, the data required may be in another form, such as the binary coded decimal form. The conversion of the data between the two forms can be readily achieved in accordance with the principles of the present invention by the use of a new and improved digital data handling circuit which utilizes electronic conversion means in combination with means for very quickly and simply selecting the nature of the output from the circuit; that is whether the output is a binary coded decimal output or is a straight binary coded output.

It is accordingly a further more specific object of the present invention to provide a new and improved apparatus for converting binary coded data into the binary coded decimal data.

Data is frequently manipulated in data processing circuitry in a serial mode or in a parallel mode; that is the information may be handled in groups simultaneously in the parallel mode or individually in time sequence in the serial mode. Insofar as the present invention is concerned, it is illustrated and described in conjunction with the parallel mode of operation for the reason that in terms of speed of data manipulation and conversion, this represents of the better methods of operation in certain types of combinations. Thus, the principles of the invention may readily be combined with a parallel type adder which operates with binary coded information. In connection with this type of operation, the apparatus readily lends itself to the inclusion of circuitry for suppressing any carry within the adder so that it is possible on the output thereof to produce an EXCLUSIVE OR function.

Accordingly, it is a still further specific object of the invention to provide a new and improved apparatus for manipulating digital data wherein the manipulating circuitry comprises a pair of gating circuits for effecting the desired transfer of data from a source of input data.

Still another more specific object of the present invention is to provide a new and improved digital data manipulating circuit which is operating in combination with a parallel adder circuit to produce on the output of the manipulating circuit the data in the adder circuit in binary coded notational form, or produce on the output thereof information in the binary coded decimal notational form.

A further more specific object of the present invention is to provide a new and improved digital manipulating circuit utilizing a binary coded adder circuit having means for suppressing the carry therein in combination with a gating circuit adapted to pass binary coded data.

The various features of novelty which characterize the invention are pointed out with particularity in the claim annexed to and forming a part of the present specification. For a better understanding of the invention, its advantages, and specific objects attained with its use, reference should be had to the accompanying drawings and descriptive matter in which there is illustrated and described a preferred embodiment of the invention.

Figure 1:
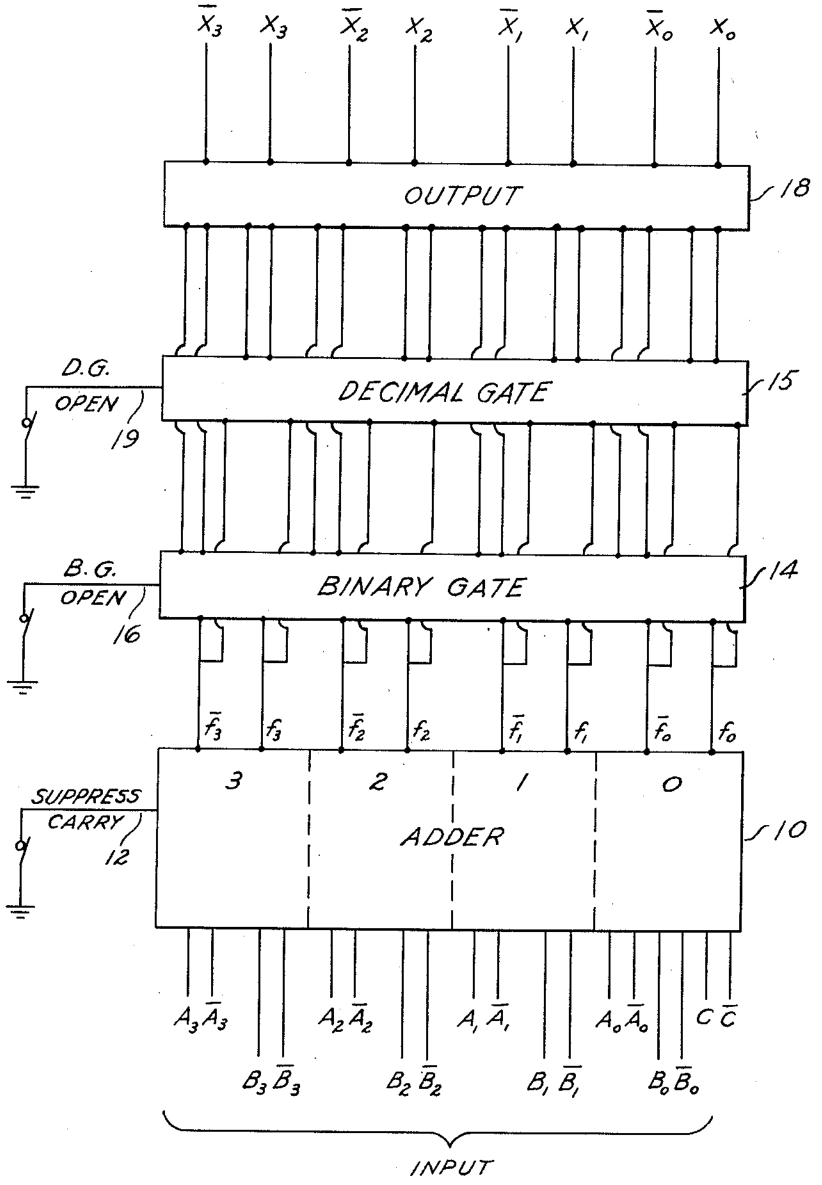
Figure 1 is a diagrammatic showing of the relationship of the major elements of the present invention.

Referring first to Figure 1, the numeral 10 represents a binary adder which is designed to operate in the parallel mode. The adder, as illustrated, is divided into four sections and these sections are identified as the sections 0, 1, 2, and 3. Each of the sections is adapted to have two functions applied to the input thereof, an A function and a B function. In addition, the zero stage may, if desired, have a carry function C applied thereto. The input functions A and B for each of the stages appears in both the assertive form A and B and the negative form $\bar{A}$, and $\bar{B}$. Similarly, the carry function in the low order stage will have a carry available in the assertive form C and in the negative form $\bar{C}$.

Within the adder circuit, there are carry circuits between stages. In certain instances, it is desired that the carry between stages be suppressed. For this purpose, a suppress carry control line 12 is provided and the activation of this particular line will condition the circuit for producing an EXCLUSIVE OR function on the output of the circuitry.

The output of each stage of the adder circuit will be in the assertive and negative form. These outputs have been designated in the assertive form by the function $f$ and in the negative form by $\bar{f}$ for each of the respective stages.

Two gating circuits are connected to the output circuits of the adder 10 and these gating circuits are a binary gate 14 and a binary coded decimal gate 15. The gate 14 has a control line 16 associated therewith which is adapted, when active, to open the binary gate 14 to permit the passage of the binary data in the adder 10 to the output circuit represented in Figure 1 by the block 18.

Connected to the decimal gate 15 is a control line 19 and this control line is effective to activate the decimal gate so that binary data applied to the input from the adder 10 will be converted into binary coded decimal data on the output and then supplied to the output circuit 18.

The output circuit 18 contains the result on its output terminals and these outputs have been designated in their assertive form by the designation X and in the negative form by $\bar{X}$.

The binary gate 14, the binary coded decimal gate 15, and the output 18 are all adapted to operate in the parallel mode so that the output will be available in parallel.

In considering the basic functioning of the circuit of Figure 1, the desired input functions which are to be added are applied to the input of the adder 10 and, when added, will activate selected ones of the output function lines $f$ on the output of each of the respective stages of the adder 10. By either automatic or manual means, one or the other of the control lines 16 or 19 will be activated to select whether the output of the adder should be reproduced on the output circuit 18 as a binary number or whether it should be produced on the output as a binary coded decimal number. If the control line 16 is active, the output circuits of the output 18 will carry the binary form of the result from the adder 10. Conversely if the control line 19 is active, the binary data on the output of the adder 10 will be available on the output circuit 18 in binary coded decimal form. As pointed out in detail below, the output circuit may well include a carry output function when a binary number is converted to a binary coded decimal number.

Figure 2:
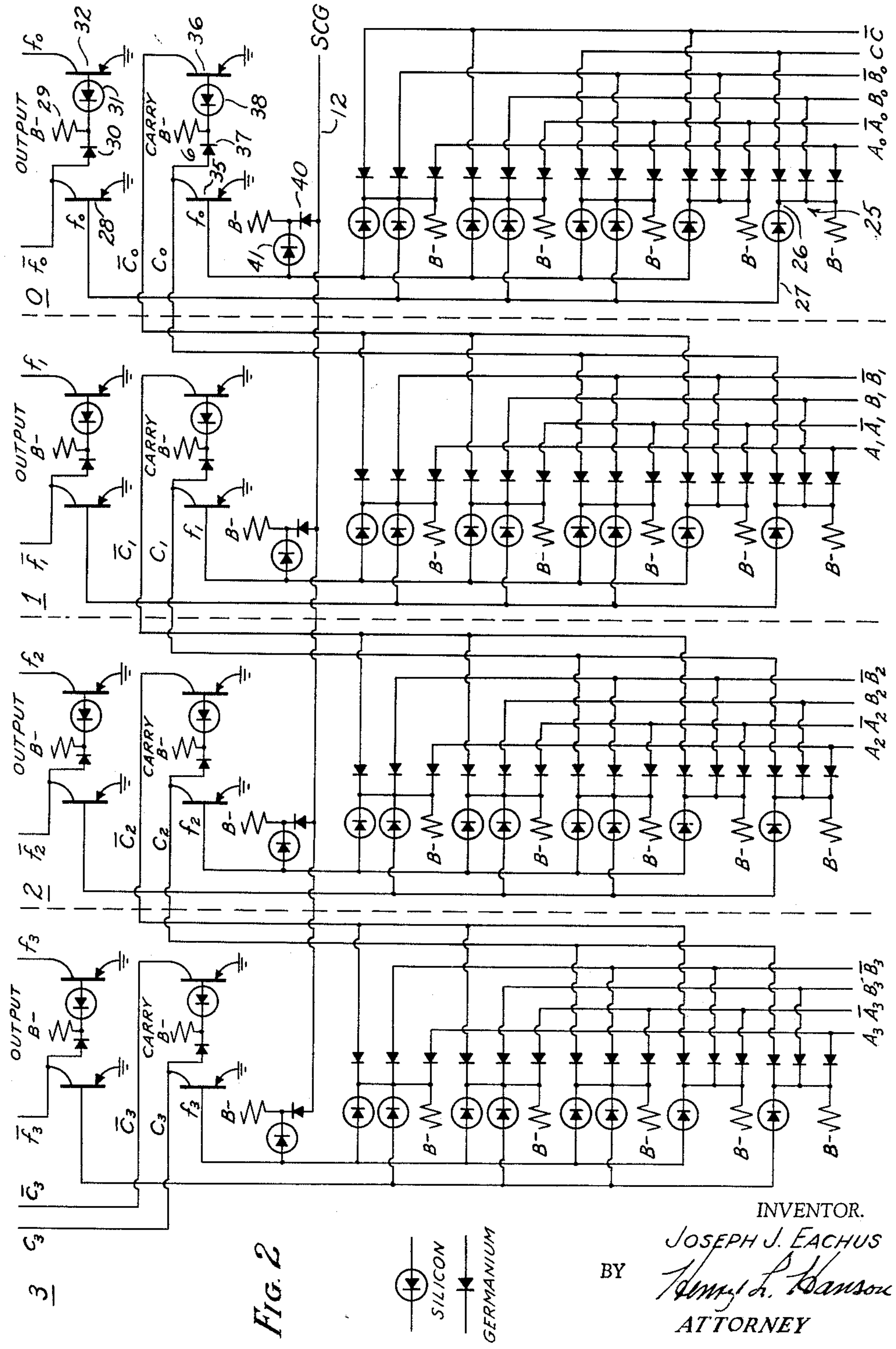
Figure 2 illustrates schematically a form of parallel adder which may be used in conjunction with the present invention.

Referring next to Figure 2, there is here illustrated in schematic detail a preferred form of binary adder circuit which is adapted to operate in the parallel mode. This adder circuit corresponds to the adder circuit 10 referred to in block diagram form in Figure 1. It will be noted in Figure 2 that this adder circuit is likewise divided into four stages 0, 1, 2, and 3. Each of these stages are substantially the same in that each one includes five input logical gating sections and two sets of output logical elements in the form of two pairs of transistors. One set of output elements is utilized for generating a carry signal for the next succeeding stages while the other pair of output elements are used for producing output functions in accordance with the bit that is actually present in the stage at the completion of an adding operation.

Considering the first stage more specifically, it will be noted that each of the five input logical gating sections are so connected as to produce on the outputs thereof those functions indicative of the adding of the binary digits applied to the input terminals A, B and C.

Each of the individual gating sections on the input include germanium diodes on the input side thereof and silicon diodes on the output side thereof. It has been found that this unique combination of germanium diodes and silicon diodes lends itself to be used as gating logical circuits for the reason that the germanium and the silicon have different thresholds of conduction. Thus, if the junction point between the silicon and germanium diodes has the potential thereof switched to a valve below the conducting threshold of the silicon diode, there will be not output signal applied through the silicon diode. On the other hand, if the germanium diodes are so arranged that no current is flowing therethrough, the signal from the power supply terminal or B minus terminal will flow through the silicon diode to the output element associated therewith, preferably a transistor as illustrated in the drawings.

Considering one of these gating circuits more specifically, the numeral 25 identifies the first gating section of the stage 0. It is desired in this particular gating section that if the functions $A_0$, $B_0$ and C are all present on the input germanium diodes, the germanium diodes will all be nonconducting and the potential point 26 will have reached such a value that the negative biasing signal will be passed through the output silicon diode, which is encircled, by way of lead 27 to the base of the output transistor 28. This latter transistor includes the normal base, emitter, and collector electrodes and is shown connected here in the grounded emitter configuration. It will be noted that this configuration has been utilized throughout all of the circuits wherein transistor devices have been employed. The presence of the signal current flowing through the lead 27 to the base of the transistor 28 will cause the transistor 28 to be switched into the conductive region so that the collector electrode thereof will be effectively grounded and consequently, the current flow through the transistor will be by way of the B minus terminal, resistor 29, diode 30 and transistor 28 to ground. This will drop the potential at the lower end of the resistor 29 to a point where the silicon diode 31 will be nonconducting. Consequently, the output transistor 32 will remain functioning as a high impedance device.

A more detailed analysis of this gating logic and various ways in which it may be implemented are disclosed in a co-pending application of the present inventor bearing Serial Number 614,839 and filed October 9, 1956.

If, under the aforeassumed conditions, the functions A, B, and C are all present at the same time on the input of the first stage, there should be a carry propagated from this stage into the next stage of the circuit. The carry logic is generated by a pair of transistor devices 35 and 36. It will be noted that the output of the gating section 25 is not connected to the base of the transistor device 35. Consequently, when there is a negative signal flowing through the lead 27, this will not in any way affect the transistor 35. Since the gating circuit 25 will be the only gating circuit which is opened under the assumed conditions, there will be no signal tending to switch the transistor 25 to its low impedance state. Consequently, the carry function on the collector electrode of the transistor 35 will be reflected as a high impedance state, or as a carry, to the assertive carry line associated with the next stage on its input negating logic.

Inasmuch as the transistor 35 is assumed in the high impedance state, the germanium diode 37 on the output thereof will be assumed to be nonconducting and therefore the potential on the input to the silicon diode 38 will be sufficient to cause this diode 38 to conduct. With current flowing through the diode 38, the transistor 36 will be switched to its low impedance state and consequently the negation of the carry logic will be inactive so that the line $\bar{C}$ will not be effective to permit the opening of any of the $\bar{C}$ lines on the next succeeding stage.

If it is assumed that in the first stage that the A and B functions are alone present on the input, and that the negation of carry $\bar{C}$ is present, an examination of the circuit will indicate that the output will be such that the carry line $\bar{C}$ will be active and the output $f_0$ will be active. This will be more readily apparent upon noting that with only the functions A and B present on the input, none of the gating circuits will be open so that no current will be flowing in the output circuits. Consequently, the transistor 28 will be nonconducting and the transistor 35 will be nonconducting. With the transistor 28 nonconducting, the germanium diode 30 will be cut off and current will be flowing from the B minus terminal of the resistor 29 and diode 31 through the base-emitter circuit of the transistor 32. This will drop the potential on the collector electrode and consequently this output line may be considered active for use in activating a gate subsequently along the gating circuitry.

It will thus be apparent that insofar as the output is concerned, a zero will be stored in the first stage as indicated by the output line $\overline{f_0}$ being up and the line $f_0$ being down.

Insofar as the carry circuits are concerned, with the functions A and B present and the function $\bar{C}$ present, the carry input transistor 35 will not have any input signal applied thereto and consequently the impedance of the transistor will be high. This will mean that the carry function C will be present and applied to the next stage of the adder. It will further be noted that with the impedance of the transistor 35 high, the silicon diode 38 will be rendered conducting and consequently the transistor 36 will be conducting. This will mean that the negation line $\bar{C}$ will be grounded so that no signal will be applied to the input gating sections of the next succeeding stage from this particular line.

Considering the adder circuit as a whole, it will be apparent that the application of any four bit binary number to the input terminals will produce on the output terminals the desired sum in the binary form. Thus, assume that the binary number applied to the A terminals of the adder is a binary 5 or 0101. Assume further that a binary 4 is applied to the B terminals of the adder and this will take the form of 0100. This will mean that the lines active on the input of the adder for the A function will be $\overline{A_3}$, $A_2$, $\overline{A_1}$, $A_0$. The lines active for the B function will be $\overline{B_3}$, $B_2$, $\overline{B_1}$, $\overline{B_0}$. It will be readily apparent that the addition of the binary 5 to the binary 4 will result in a binary 9 appearing in the output. Thus, the output lines of the circuit which will be active will be $f_3$, $\overline{f_2}$, $\overline{f_1}$, $f_0$. This represents the sum of 1001.

As pointed out above, another feature present in this adder circuit is the control line 12 which is useful for suppressing a carry between stages. This carry suppression control line 12 may be used to suppress the carry by applying a grounding signal to the control line. Thus, in the first stage, with the control line 12 grounded, current will flow through the gating germanium diode 40 and consequently no current will flow through the silicon diode 41 which is on the output. This will mean that the carry will not be suppressed under the circumstances. However, if the ground is removed from the control signal line 12, the silicon diode 41 will be rendered conducting, as will the corresponding diodes in each of the other stages, and the transistor 35 will be rendered conducting so as to be switched to the low impedance state. This will deactivate the carry line C and will supply the necessary control function for maintaining the transistor 36 in its high impedance state so that the output function $\bar{C}$ will be present. This condition will be true whether or not the carry function comes from the input gating circuits associated with the stage.

Figure 3:
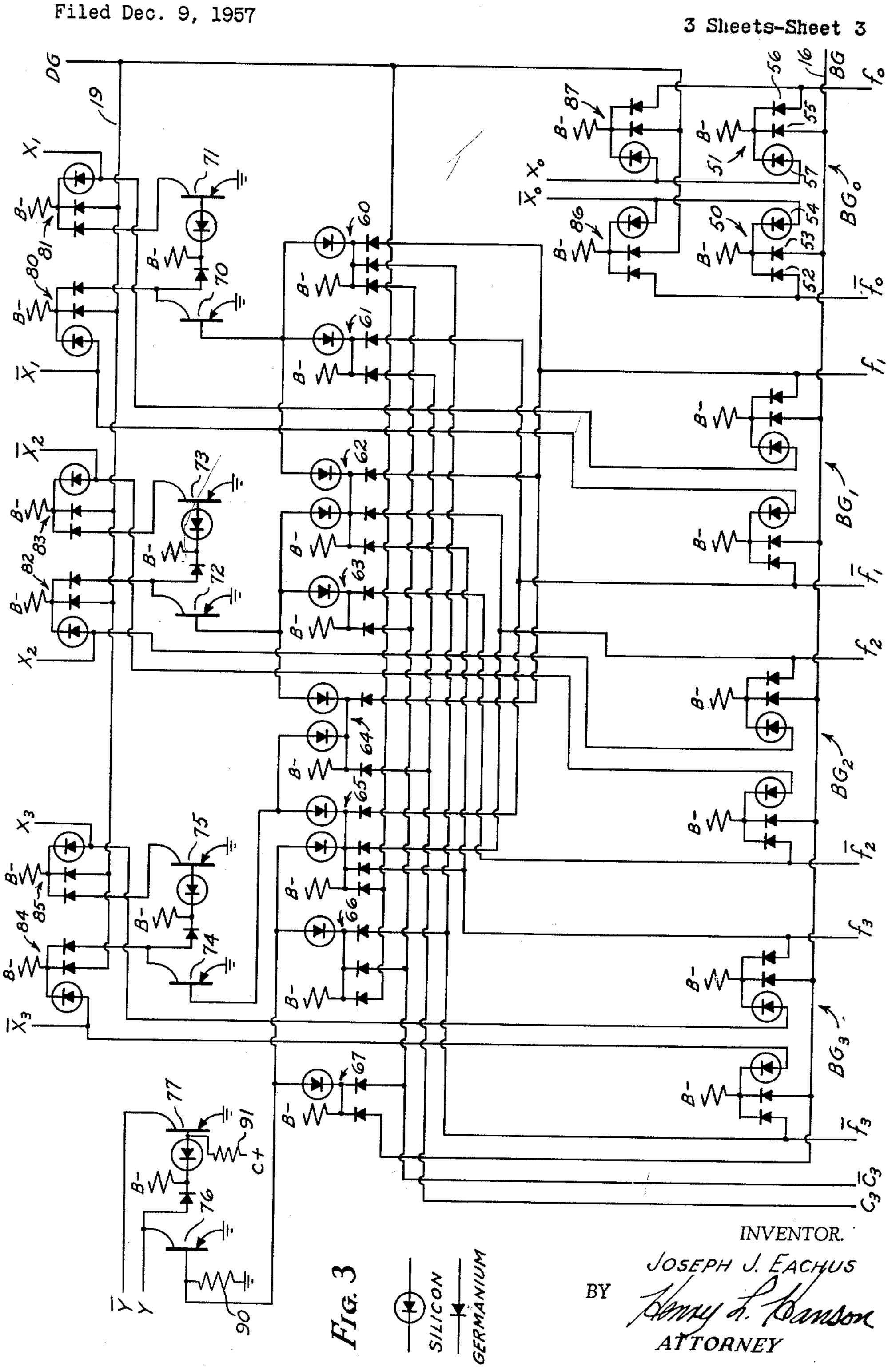
Figure 3 illustrates the output circuitry associated with the present invention.

The output gating circuitry of the present combination is illustrated in schematic detail in Figure 3. As illustrated, the inputs to the gating circuits are by way of the output circuits of the adder circuit and the functions applied to the gating circuits are $f_3$, $\overline{f_3}$, $f_2$, $\overline{f_2}$, $f_1$, $\overline{f_1}$, $f_0$ and $\overline{f_0}$. These outputs represent the four bits which may be present in the output stages of the adder circuitry. Adjacent the lower portion of the drawing is the gating circuit associated with the binary gate 14. There are four separate gating stages and these are identified by the notation $BG_0$, $BG_1$, $BG_2$, and $BG_3$.

Considering specifically the gating section $BG_0$, it will be seen to comprise two separate gating circuits 50 and 51. The gating circuit 50 has two input germanium diodes 52 and 53 and an output silicon diode 54. The output silicon diode has its output directly connected to the output line $\overline{X_0}$. The gating section 51 comprises a pair of input germanium diodes 55 and 56 and an output silicon diode 57. This latter diode has its output connected to the output line $V_0$. The opening and closing of the binary gating circuits is accomplished by way of the binary gate control line 16. When this control line is grounded, the gating sections immediately associated therewith are all closed. However, when the ground is removed from the control line 16, the gating sections are conditioned for the passage of a signal providing the associated input is conditioning the other gate leg. Thus, if the input line $\overline{f_0}$ is active, and the control line 16 is active, the diodes 52 and 53 will be cut off and therefore the gating section 50 will be open so that a signal will be free to flow through the output silicon diode 54 to the output line $\overline{X_0}$.

It will be readily apparent that the other gating sections of the binary gate, namely the gates $BG_1$–$BG_3$, will operate in the manner described with respect to the gate $BG_0$. It will further be apparent that since the illustrated Figure 2 is operating in the binary mode, the gating circuits of the binary gate will actually be passing the information directly from the adder circuit to the output terminals. In this case, there will be no alteration of the manner in which the information is present in the output of the adder circuit. The output terminals are illustrated at the top of the drawing and are identified by the notation $X_3$, $X_2$, and $X_1$. Thus, the gating sections $BG_3$, $BG_2$, $BG_1$ will each be effective to control the appropriate output terminals insofar as the output signals are concerned. In the present circuit, it is apparent that if the control line 16 is active for opening the binary gate circuits that the decimal gate control line 19 should not be active at the same time.

The decimal gate associated with the circuitry of Figure 3 is somewhat more complex in the binary gate for the reason that the circuit must function not only as a gating circuit but also as a circuit for converting data in the binary form to binary coded decimal form. The input to this gating circuit is by way of a series of eight input gates which carry the reference numerals 60, 61, 62, 63, 64, 65, 66 and 67. The input gating circuits 60, 61 and 62 are provided for controlling the operation of a pair of output transistor devices 70 and 71, the latter both having a normal base, emitter and collector electrodes. These latter two transistors are associated with the output terminals $\overline{X_1}$ and $\overline{X_1}$.

The input gating circuits 62, 63 and 64 are associated with a further pair of output transistor devices 72 and 73 and these two devices are associated with the output terminals $X_2$ and $\overline{X_2}$.

The input gating sections 64 and 65 are both associated with a further pair of output transistors 74 and 75 and these two transistors are used to control the signals present on the output lines $X_3$ and $\overline{X_3}$.

The input gating sections 65, 66 and 67 are associated with a pair of output transistors 76 and 77. These latter two transistors are utilized for producing a carry function Y or $\bar{Y}$ in accordance with whether there is a carry resulting from the conversion of a binary number to a binary coded decimal number.

Associated with the two output transistor devices 70 and 71 are a pair of gating circuits 80 and 81. These two gating sections have as one input the signal from the control line 19 and on the other input the signal from one or the other of the transistor devices 70 and 71.

The output transistor devices 72 and 73 have associated therewith a further pair of output gating sections 82 and 83. These two gating sections also have intputs from the gate control line 19 and from the transistors 72 and 73.

The output transistors 74 and 75 also have a pair of gating sections associated therewith at 84 and 85. These gating sections are also adapted to be active when the appropriate output transistor is active and the control line 19 is active.

Each of the transistors used in the adder and in the gating circuits may well incorporate a resistor which is connected between the base and ground. This resistor acts to keep the base of the transistor from floating in the event the silicon diode on the input is cut off. Such a resistor is shown at 90 on transistor 76. Instead of being connected to ground, the resistors may be connected to a C+ power supply terminal in the manner indicated at 91 on transistor 77. The potential of this C+ power supply terminal may be varied for the marginal checking of the entire circuit.

The operation of this conversion and output gating circuitry may be understood by considering specific examples. First, it is assumed that the number present in the adder output circuit shown in Figure 2 is a binary number 0100. This will mean that the output lines on the output of the adder, thence on the input of the gating circuits, will be $\overline{f_3}$, $f_2$, $\overline{f_1}$ and $\overline{f_0}$. Since a binary coded decimal four corresponds to a binary four, the output signal on the output lines should be in the form that the signal is present in the output of the adder. Thus, the output signal should take the form of $\overline{X_3}$, $X_2$, $\overline{X_1}$ and $\overline{X_0}$. Insofar as the zero stage is concerned, with the function $\overline{f_0}$ present, the signal will be transferred into the gating section 86 and with the control line 19 active, the gate 86 will be open so that the output line $X_0$ will be active.

Considering the second stage of the circuit, the output line $\overline{f_1}$ will be active and the output stage 3 carry line $\overline{C_3}$ will be inactive. The transistor 70 will be nonconducting so that its output collector electrode will be active and with the control line 19 active, the output line $\overline{X_1}$ will be active.

With the function $f_2$ present, this function will be applied to the gating section 62. However, the $f_1$ line, also connected to the gating section 62 will be down or inactive so that no signal will be flowing to the input of the transistor 72. Consequently, the transistor 72 will be in its high impedance state so that the collector electrode thereof will be active to thereby, with the signal from the control line 19, via line 82 to produce the output signal $X_2$.

The fourth stage output which will be $\overline{f_3}$ and $f_3$ will be applied to the gating section 66. At the same time, a negation carry signal from the fourth stage of the adder, stage 3, in the form $\overline{C_3}$ will be applied to the gate 66. This will cause the output diode of the gating circuit to conduct and therefore the transistor 76 will conduct to remove the carry function Y and to activate the output negation carry line $\overline{Y}$. Insofar as the output signal $\overline{X_3}$ is concerned, the signal will be produced with the transistor 74 being in the nonconductive state. This transistor will be in the nonconductive state for the reason that the function $f_1$ will be inactive and will appear as a grounding signal on the input of the gate 65 to thereby close the gate.

It will thus be apparent from the foregoing example that the output lines which are active will be $\overline{X_3}$, $X_2$, $\overline{X_1}$, $\overline{X_0}$.

Assuming a further set of operating conditions, the following example may be used to demonstrate how the circuitry operates when there is a carry operating in conjunction with the binary coded decimal information. If a binary coded decimal nine is applied to each of the input terminals for the functions A and B of the adder, the sum will be eighteen. In the binary code, this will be represented by a carry from the fourth stage and the output line $f_1$ being active. This will correspond to a binary 10010. However, in the output it is desired that the information take the form of a binary coded decimal eight and a carry of one or 0001, 1000.

If, as assumed above, the carry line $C_3$ is active and the output line $f_1$ is active, it will be seen that the circuits are so operative that the output carry line Y and the fourth stage output line $\overline{X_3}$ are active and the other output lines will be active in the negative sense. Thus, the output line $\overline{f_0}$ will be active and with the gate control line 19 active, the output line $\overline{X_0}$ will be active.

With the output line $f_1$ active, and with a carry signal $C_3$, the gate 64 will be opened and will provide the signal for switching the transistor 74 into the conducting state. This will mean that the transistor 75 will be switched to the nonconducting state so that the gate 85 will be conditioned to pass the signal to the output line $X_3$.

With the $\overline{f_1}$ line down, the gate 61 will be closed and therefore the output signal line $\overline{X_1}$, by way of transistor 70, will be active. With the signal $\overline{f_2}$ present on the circuitry, and with the carry line $\overline{C_3}$ down, the gate 63 will remain closed so that the transistor 72 will be conducting. If the transistor 73 is nonconducting it will condition the gate 83, and the output line $\overline{X_2}$ will be active.

With the carry line $\overline{C_3}$ down or inactive, this signal will be applied to the gate 67 and will maintain this gate closed. Consequently, the carry transistors 76 will remain in the high impedance state so that the output function or carry function Y will be present on the output.

It will thus be apparent from this second example that this apparatus will function to convert binary information in the adder circuit to binary coded decimal information on the output terminals with the conversion being so arranged that the low order binary coded decimal number will appear on the output X terminals, and, if there is a carry, this will appear on the output Y terminals.

In actual practice, the above described circuit is utilized in one or the other of its two main modes of operation. That is, if the system is operating with binary information on the input to the adder, the output will normally be taken from the binary gate output circuits. Conversely, if binary coded decimal information is supplied to the input of the adder, and the decimal gates opened, the data on the outputs of the circuits will be in binary coded decimal form.

In certain instances, it is desired that the carry be suppressed, as set forth above, and in this case it is preferable to operate the circuit such that the binary gate line 16 will be active at the same time that the suppress carry gate 12 is active. This will produce on the output end terminals an "EXCLUSIVE OR" function. This EXCLUSIVE OR function is available to an operator utilizing the apparatus for the manipulation of the bits that have been applied to the input of the binary adder.

The apparatus described above has particular advantage where a number of sections similar to that illustrated in Figures 1–3 are used. The advantage may be illustrated by considering the manner in which two binary numbers are added and appear at the output and also how two binary coded decimal numbers are added. Consider first that two binary numbers are added as follows:

| | | | |
|---|---|---|---|
| Binary | 0 1 1 0 | 0 1 1 0 | =Decimal 102 |
| Binary | 0 1 0 1 | 0 1 0 1 | =Decimal 85 |
| Sum | 1 0 1 1 | 1 0 1 1 | =Decimal 187 |

Using the present circuit as an eight stage adder with a binary input and the binary gate output line active, the output will be as indicated above in binary form.

If the same input bit combination is applied to the input of the adder but the code represents a binary coded decimal number, a different result will be had if the decimal gate is active on the output of the circuit. This may be demonstrated as follows:

| | | | |
|---|---|---|---|
| Binary coded decimal | 0 1 1 0 | 0 1 1 0 | =Decimal 66 |
| Binary coded decimal | 0 1 0 1 | 0 1 0 1 | =Decimal 55 |
| Sum | 1 0 0 1 0 | 0 0 0 1 | =Decimal 121 |

It will be readily apparent that the circuit functioning may be extended to any combination of binary numbers or binary coded decimal numbers, the limit being only in the number of operative stages in the adder and in the output gating circuits.

In the event there are only two stages in the latter example, an end around carry may be used in which event a "1" will be added in the low order stage and the result in the adder will be "22." This is the modulus 99 residue of the normal result in the adder.

An end around carry in the binary case results in modulus $2^n-1$ addition where $n$ is the number of binary stages.

It will be readily understood by those skilled in the art that many modifications may be made in the construction and arrangement of the specific illustrative embodiment of the circuitry disclosed herein without departing from the real purpose and spirit of the invention. It is accordingly intended that the scope of the invention be limited solely by the appended claim.

What is claimed as the invention and for which it is desired to secure by Letters Patent is:

In combination; a multiple-stage parallel binary digit adder, each stage of which defines a selected binary order and comprises a plurality of gating circuits adapted to have as inputs the assertions and negations of a pair of input operands, each of said gating circuits comprising input diodes for each of the input operands and output diodes, at least three of said gating circuits having two output diodes and two of said gating circuits having a single output diode, each stage further comprising a pair of adder outputs selectively connected to the outputs of said gating circuits so that one output diode of said three gating circuits is connected to one adder output and the other output diode of said three gating circuits is connected to the other of said adder outputs and the single output diodes of said two gating circuits are connected one each to said pair of adder outputs, each of said adder outputs comprising two transistors directly coupled together so that the output of one will be active when the other is inactive to form the assertion and negation of the sum of the input operand bits in the output of said stage in said one adder output and the assertion and negation of the carry result of the input operand bits in said other of said adder outputs, and means connecting the assertions and negations of the carry output of each stage to the input gating circuits of the next higher order stage of said adder; means connecting each of the assertions and negations of the sum outputs of each of said stages to a pair of transfer gating sections, the first of said transfer gating sections comprising a plurality of separate gating circuits arranged to be connected one each to the respective assertion and negation sum outputs of each of said adder stages, a further common input signal line connected to each of said separate gating circuits of said first transfer gating section so that all of said gating circuits thereof may be opened at one time, the second of said transfer gating sections comprising a plurality of separate gating circuits arranged to be connected to at least one each of the respective assertion and negation sum outputs of each of said adder stages and selectively cross-connected to the assertion and negation sum outputs of all of said adder stages, except the low-order stage thereof, and the assertion and negation of the carry output of the high-order stage, of each four stages, so that binary coded sum data will be converted to binary coded decimal data, a second common input gating signal connection to each of the gating circuits of said second gating section so that all of said gating circuits thereof may be opened at one time, an output terminal connection for each order of said gating circuits, other than the low-order gating section of said second transfer gating section, a pair of direct coupled output transistors connected to each of said output terminals so that the assertions and negations of the respective output terminals will appear on the outputs of said transistors; an assertion output terminal and negation output terminal for each stage of said adder; means connecting the outputs of the respective gating circuits of each stage of said first transfer gating section to said respective assertion and negation output terminals; and means connecting the outputs of said output transistors to said respective assertion and negation output terminals.

References Cited in the file of this patent

FOREIGN PATENTS 755,441 Great Britain ------------ Aug. 22, 1956

OTHER REFERENCES

Harvard Staff, Synthesis of Electronic Computing and Control Circuits (May 1951), pp. 186, Fig. 12.32.

Richards: Arithmetic Operations in Digital Computers (March 1955), D. Van Nostrand, N.Y., Figs. 4–17.